United States Patent [19]

Wang

[11] Patent Number: 5,052,145

[45] Date of Patent: Oct. 1, 1991

[54] ELECTRIC FISHING FLOAT

[76] Inventor: Wen-Chang Wang, No. 208-13, Shang-Lun Village, Jen-Te Hsiang, Tainan Hsien, Taiwan

[21] Appl. No.: 633,963

[22] Filed: Dec. 26, 1990

[51] Int. Cl.$^5$ ............................................. A01K 75/02
[52] U.S. Cl. ........................................ 43/17.5; 43/17.1
[58] Field of Search ........................ 43/17.5, 17.6, 17.1

[56] References Cited

U.S. PATENT DOCUMENTS

| | | | |
|---|---|---|---|
| 3,292,294 | 12/1966 | Beach et al. | 43/17.5 |
| 3,878,635 | 4/1975 | Trosper et al. | 43/17 |
| 4,070,784 | 1/1978 | Yokogawa et al. | 43/17.5 |
| 4,175,348 | 11/1979 | Ray | 43/17.6 |
| 4,461,114 | 7/1984 | Riead | 43/17.5 |
| 4,627,187 | 12/1986 | Williams | 43/17.1 |
| 4,884,355 | 12/1989 | Neihoff et al. | 43/17.5 |

Primary Examiner—Richard K. Seidel
Assistant Examiner—Chuck Y. Mah
Attorney, Agent, or Firm—Morton J. Rosenberg; David I. Klein

[57] ABSTRACT

An electric fishing float comprising an elongated tubular fishing float case loading a cell used as a power source and a light source such as a light emitting diode or miniature lamp adjacent the closed top end thereof and a piston-like conductor of a magnet mounted to reciprocate in the fishing float case to pass through a position to cause a sudden burst of light in the light source by conducting a normally open conductive switch into a closed state in responding to biting by a fish.

1 Claim, 1 Drawing Sheet

ELECTRIC FISHING FLOAT

BACKGROUND OF THE INVENTION

The present invention relates to an improvement over an electric fishing float of the type incorporating therein an elongated cylindrical cell for repeatedly turning on a light source located within an elongated float body adjacent the closed end therof.

The conventional electric fishing float has a problem that electric connection between the cell and the light source is not stable and reliable. Another problem is that the replacement of a cell is not so easy. Furthermore, the light source therof remains to turn on along the period in use so that at least two cells must be provided. As a result, the electric fishing floats becomes large in size and heavy in weight, resulting in poor response to biting by a fish.

SUMMARY OF THE INVENTION

In view of the above, one of the objects of the present invention is to provide an electric fishing float having an extremely elongated body so that the sharp response to the biting by a fish may be attained.

Another object of the present invention is to provide an electric fishing float wherein electrical interconnection between a cell and a light source is highly stable, reliable and dependable in operation and the easy replacement of a cell may be effected.

A further object of the present invention is to provide an electric fishing float wherein the light source flashes in response to the biting by a fish to indicate such biting and save energy consumption from the cell.

DETAILED DESCRIPTION OF THE PREFERRED EMBODIMENT

Figure 1:
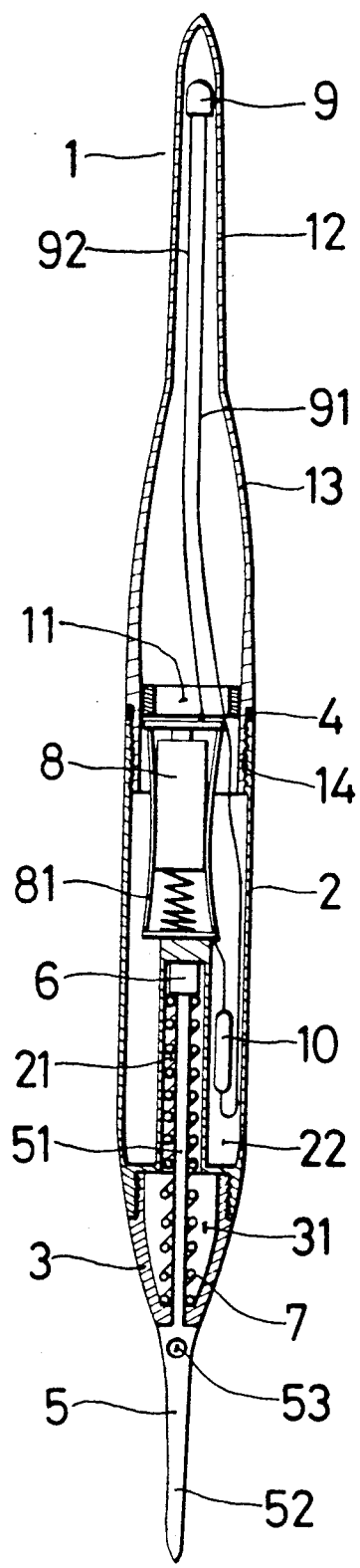
FIG. 1. is a cross-sectional view of a preferred embodiment according to the present invention.

Referring to FIG. 1, a fishing float according to the present invention includes an elongated tubular case comprising an upper tubular case 1, a lower tubular case 2 and a downwardly tapered leg portion 3. The upper tubular case 1 is made of a transparent synthetic resin and consists of a smaller diameter tubular section 12 with a closed top end, a large diameter tubular section 13 and a smaller diameter male section 14 with an open bottom end and an external screw. The lower tubular case 2 is made of an opaque synthetic resin and has an open top female section formed with an inner screw for interengaging the external screw of the male section 14 of the upper tubular case 1. A sealing ring 4 is provided between the upper and lower tubular cases 1, 2 for water tight sealing.

The tapered leg portion 3 is attached to the bottom end of the lower tubular case 2 by means, for example, of thread engagement and includes an elongaed leg 5 having a rod section 51 axially slidably received in the tapered leg portion 3 and the lower tubular case 2 and a conical body 52 protruding from the tapered leg portion 3 with an eye 53 for connection with a fishing line. A light source 9 such as a light emitting diode or miniature lamp is placed in the small diameter tubular section 12 of the upper case 1 adjacent the closed top end thereof and is electrically connected through lead wires 91, 92 and a magnetic switch 10 connected to the lead wire 91 and to the terminals of the battery or cell 8.

A cylindrical compartment 21 is coaxially formed in a lower portion of the inner chamber of the lower tubular case 2 and extending downwardly to communicate inner chamber 31 of the tapered leg portion 3. Bottom of the tapered leg portion 3 is formed with an opening axially in alignment with passage of the cylindrical compartment 21 for inserting the rod section 51 of the elongated leg 5 into the passage of the cylindrical compartment 21. A cylindrical magnet 6 is secured on top end of the rod section 51 by means of adhesion or welding to reciprocate axially within the passage of the cylindrical compartment 21 and serve as a flange for retaining the upper end of a coil spring 7 which sleeves aroung the rod section 51 of the elongated leg 5 for retracting the cylindrical magnet 6 into its uppermost position in the passage of the cylindrical compartment 21.

The battery or cell 8 is located within a battery chamber defined by a housing 81 which is made of an electrically conductive material and is releasably retained between top of the cylindrical compartment 21, which is made of electrically insulating material, and a ring-shaped retainer 11 of which the central opening allows passing therethrough of the lead wires 91, 92.

The magnetic switch 10 is disposed within a narrow chamber 22 defined by the cylindrical compartment 21 and outer side wall of the lower tubular case 2 and is a normally open switch which is conducted into a closed state to turn on the light source 9 only when a magnet such as the cylindrical magnet 6 locates next to it.

In response to biting by a fish, the fishing float of the present invention will flash to warn the fisher using this device. Each biting by a fish moves the cylindrical magnet 6 from its uppermost position along the passage of the cylindrical compartment 21 that renders the cylindrical magnet 6 to pass across the magnetic switch 10 to cause a sudden burst of light in the light source 9. After the force exerted on the leg 5 is released, the coil spring 7 automatically retracts the cylindrical magnet 6 into its uppermost position that renders the cylindrical magnet 6 once again to pass across the magnetic switch 10 to cause another sudden burst of light in the light source 9. Continuous or repeated bitings by a fish render the light source 9 to flash.

The battery or cell 8 can be replaced in a very simple manner. The upper and lower tubular cases 1, 2 can be separated from each other by threading to disengage the thread interengagement therebetween then the battery housing 81 is exposed for replacing the battery or cell 8 therein.

I claim:
1. An electric fishing float comprising:
an elongated tubular fishing float case consisting of an upper case section with a light source positioned therein adjacent a closed top end thereof, a lower case section having a first end water-tightly connected to said upper case section and a second end formed with a central opening, and a tapered hollow section having a first end water-tightly connected to the second end of the lower case section and a second end formed with a central opening axially in alignment with the central opening of the lower case section;
an insulating cylindrical compartment coaxially formed in the lower case section to define a cylindrical chamber axially in alignment with the cen- tral openings of the lower case section and the tapered hollow section;

a piston-like member made of magnetic material and adapted to reciprocate axially within the cylindrical chamber of the cylindrical compartment between a first position axially apart from the central opening in the second end of the lower case section and a second position axially close to the central opening in the second end of the lower case section to pass through a third position between the first and second positions and imparting a rod member extending axially from the piston-like member to exterior of the fishing float case through aligned central openings of the lower case section and tapered hollow section;

a conical body attached to outer end of the rod member for connection with a conventional fishing line thereby to be pulled to move the piston-like member from its first position into second position;

a cell having two electrodes and confined within an electrically conductive battery housing which is mounted on the cylindrical compartment in the lower case section;

a pair of lead wires for electrically connecting said light source and electrodes of the cell;

a normally open conductive switch connected to one of the lead wires and disposed next to the cylindrical compartment and conducted into a closed state to turn on the light source by the piston-like member when the piston-like member locates in its third position; and a coil spring sleeved around the rod member for retracting the piston-like member from its second position into its first position.

* * * * *